United States Patent [19]

Bannett et al.

[11] 3,735,944

[45] May 29, 1973

[54] DUAL MODE GUIDANCE AND CONTROL SYSTEM FOR A HOMING MISSILE

[75] Inventors: Roger J. Bannett, Willow Grove; Roland S. Hal, Jr., Ivyland, both of Pa.

[73] Assignee: The United States of America as represented by the Secretary of the Navy, Washington, D.C.

[22] Filed: June 25, 1971

[21] Appl. No.: 156,672

[52] U.S. Cl. .................... 244/3.15, 244/77, 250/206
[51] Int. Cl. ............................ F41g 7/00, F41g 7/10
[58] Field of Search .................... 244/3.16, 3.15, 77; 235/61.11; 250/206

[56] References Cited

UNITED STATES PATENTS

| 2,826,380 | 3/1958 | Ketchledge | 318/640 |
| 3,077,333 | 4/1963 | Newell | 244/3.2 |

Primary Examiner—Benjamin A. Borchelt
Assistant Examiner—J. V. Doramus
Attorney—R. S. Sciascia and Henry Hansen

[57] ABSTRACT

A missile guidance system having two control modes alternatively controlling the thrust vector of the missile. The first control mode provides turning commands for substantially aligning the missile towards an airborne target, and the second control mode controls the missile on a homing path in pursuit of the target once the missile is aligned. A threshold detector operates switches for selectively enabling the control modes, where the first mode is enabled at an angular rate of the target line-of-sight above a predetermined threshold and the second mode is enabled at a light-of-sight rate below the threshold. The first mode provides thrust vector control signals corresponding to a signal sum of the component angle signals of the line-of-sight emitted by a narrow field of view infrared sensor mounted on the missile and continuously locked on to the target, angular rate signals of the line-of-sight, and acceleration signals emitted by an accelerometer having orthogonal sensing axes normal to the line-of-sight. The second mode provides thrust vector control signals corresponding to the difference between the signal sum of the first mode and accelerometer signals emitted by an accelerometer mounted on the missile having orthogonal sensing axes normal to the missile.

8 Claims, 3 Drawing Figures

Patented May 29, 1973

INVENTORS
ROGER J. BANNETT
ROLAND S. HALL, JR.

ATTORNEY

INVENTORS
ROGER J. BANNETT
ROLAND S. HALL, JR.

ATTORNEY

DUAL MODE GUIDANCE AND CONTROL SYSTEM FOR A HOMING MISSILE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to air-to-air actively guided homing missiles and more particularly to the guidance and control apparatus therein.

Aircraft launched air-to-air actively homing missiles often experience large misalignment of the initial velocity vector with respect to a target that is to be pursued. The initial misalignment necessarily occurs due to the inherited orientation of the missile from the aircraft longitudinal body axis, where the aircraft body axis is not necessarily always directed at the target at the time of launch. Accordingly, in a large majority of cases the launch deployment of an air-to-air missile occurs with the missile velocity vector being misaligned with the desired intercept vector or the target, and the launched missile then must undergo the vectoring maneuver to align itself appropriately for intercept. Generally, in an effort to optimize weight and to allow for a multiple missile launch capability it is desirable that the overall missile weight be minimized and consequently its propellant energy is minimized with the result that only short durations of burn are possible. Consequently the expenditure of propellant energy used in the initial vectoring maneuver is a critical limitation on the duration of burn during the homing portion of the flight. Typically in order to utilize to best advantage the residual speed of the missile immediately after separation, which is inherited from the speed of the aircraft, the prior art utilized aerodynamic surface controls in order to provide the turning moments vectoring the missile body. This technique, although highly successful in a high speed flight regime, is not very successful during low speed since the amount of turning moment possible is limited by the stall angle of the aerodynamic surface, their limited size and dynamic pressure due to the low missile speed, and the missile has to be accelerated on its own power to an effective speed. Thus aerodynamic surface controls are only optimal in application where the launch of the missile occurs at a relatively high speed. Also, the speed differential between the target and the missile must necessarily be made up by the propellant energy of the missile. In such cases the use of the missile-stored propellant for the purpose of accelerating the missile to an effective speed for aerodynamic control at a vector not directed to the target greatly reduces the overall range of the missile and its chase capability. Thus, the combination of aerodynamic controls are not always optimum.

A second mode of missile control, generally practiced in the prior art, is thrust vector control wherein the turning moments on the missile body are generated by vectoring the thrust axis by an external homing loop. In this mode very often internal control augmentation loops closing at the thrust axis are provided to reduce the normal accelerations of the missile body, i.e., in order to get the maximum velocity increment along the missile body from the propellant the prior art typically limits the velocity components normal to the longitudinal body axis. Accordingly the external homing loop is typically limited in authority by the internal loops and consequently requires large turning radii in order to align the body axis and the flight path towards the target. This approach, although successful in conserving propellant energy where small initial missile velocity vector misalignment with respect to the target is experienced, is also not very successful for large missile target misalignments.

SUMMARY OF THE INVENTION

Accordingly, it is the general purpose and object of the present invention to provide an air-to-air missile which can be deployed at a relatively low speed and which, by minimal use of propellant, can be reoriented over large angles towards the target. Other objects of the invention are to conserve propellant consumption and to reduce homing and chase time with a minimum equipment complement on the missile.

These and other objects are accomplished within the present invention by providing in an air-to-air homing missile a servo-articulated narrow field of view sensor, such as an infrared sensor, which is continuously locked on and pointing to the target. An accelerometer having two orthogonal sensing axes is mounted in a plane normal to the central axis of the sensor field of view, registering the accelerations of the missile in a plane normal to the sensor. Signals corresponding to the sensor angles, their respective rates and the corresponding accelerometer outputs are summed in two orthogonal planes, both containing the longitudinal coordinate of the missile, providing control commands to a gimbaled rocket nozzle at the aft end of the missile, such that exterior or homing loops for controlling the missile in two orthogonal planes extending along its longitudinal axis are formed. Additional internal or stability augmentation loops, also commanding the rocket nozzle, are included providing complementary nozzle gimbal commands in response to missile accelerations normal to the body longitudinal axis and to missile angular rates. Thus when the missile is generally oriented towards the target, registering relatively small angular sensor rates, the stability augmentation loop accelerometers normal to the body axis and the accelerometers on the sensor complement each other providing both commands to the nozzle correcting lateral body deviations from the flight path and directing the flight path to intercept the target. Where, on the other hand, the sensor axis registers large angular rates large changes in missile flight path are required and the body accelerometers tend to limit such changes in the flight path. This results in unnecessary consumption of propellant and time since in this mode large changes in flight path, or large velocity components normal to the body, require large turning radii constrained by the accelerometer signals normal to the missile. Accordingly, within the present invention, the signals of the accelerometers normal to the body are interrupted by a switch which is opened at a predetermined angular rate of the sensor, such that in the open switch mode the nozzle commands are dependent on the sensor angles, rates and accelerations normal to the sensor axis only and are independent of the body normal accelerations. The resulting open switch control loop signals tend to quickly align the body towards the target, at minimal accelerations normal to the pointing vector, at the same time turning the missile laterally to its flight path such that the velocity along the original flight path is quickly dissipated by the large lateral aerodynamic drag of the missile and a new flight path towards the target is assumed. Once the missile flight path is generally aligned to intercept the target the sensor angular rates are reduced and the body accelerometer signals are switched in stabilizing the missile along its intercept path.

DESCRIPTION OF THE PREFERRED EMBODIMENT

Figure 1:
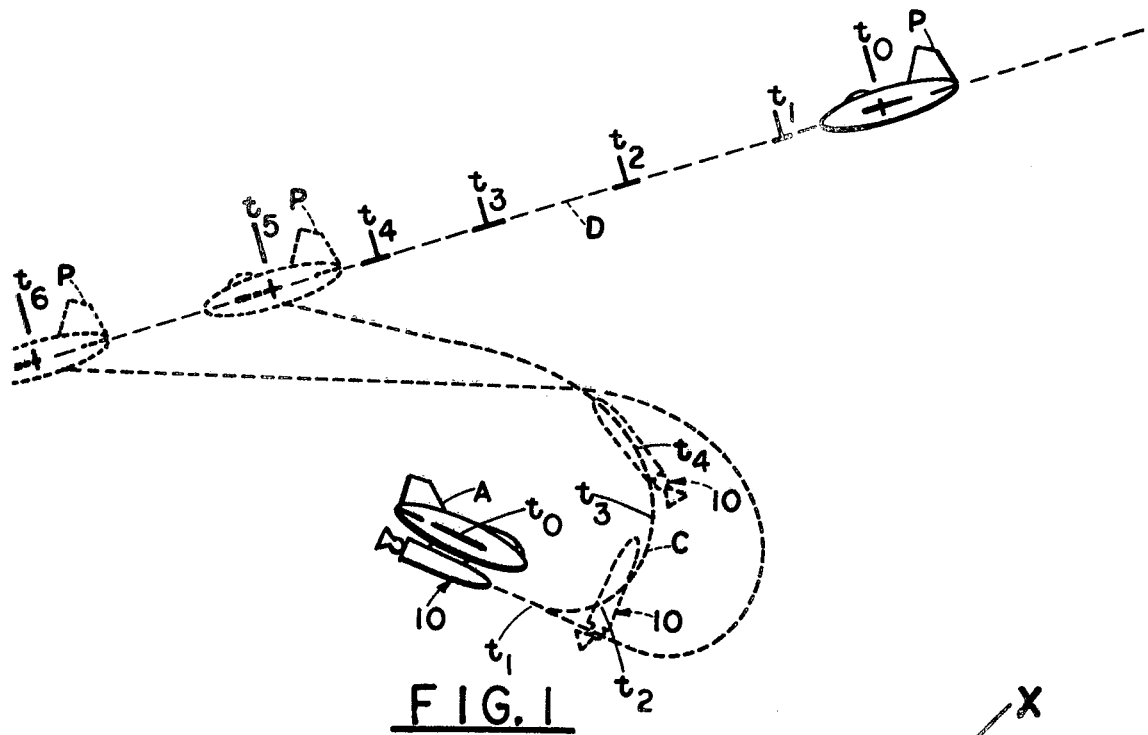
FIG. 1 is a time sequenced illustration of an air-to-air missile guided according to the present invention on a homing flight path to a target.

As shown in FIG. 1 an air-to-air homing missile 10 is originally suspended from the underside of an aircraft A at time $t_0$, at which time it is launched from the aircraft A in pursuit of an airborne target P traveling along flight path D. From the launch time $t_0$ to a time $t_1$ the missile follows a generally linear path, along a flight path C, of sufficient duration to clear the aircraft before any homing maneuvers are commenced. At time $t_1$ the missile 10 homing guidance is enabled commencing to orient the missile and its flight path C towards the target P. At time $t_2$ missile 10 is turned presenting a relatively large angle of attack with respect to its flight path C such that the resulting drag tends to decelerate the missile, dissipating its original velocity and thus enabling a relatively small radius of flight path reorientation between time $t_2$ and $t_3$ to the intercept flight path. The relative position of target P, concurrently proceeding along its flight path D to a location at time $t_2$, describes a relatively large line-of-sight angle and line-of-sight angular rate between the missile 10 longitudinal axis and the location $t_2$ of target P. At times $t_3$, $t_4$ along flight path D the target P is generally within small angle deviations from the corresponding alignment of missile 10 at time $t_3$ and $t_4$ on flight path C. Accordingly, at these times only small changes in missile attitude are required.

Figure 2:
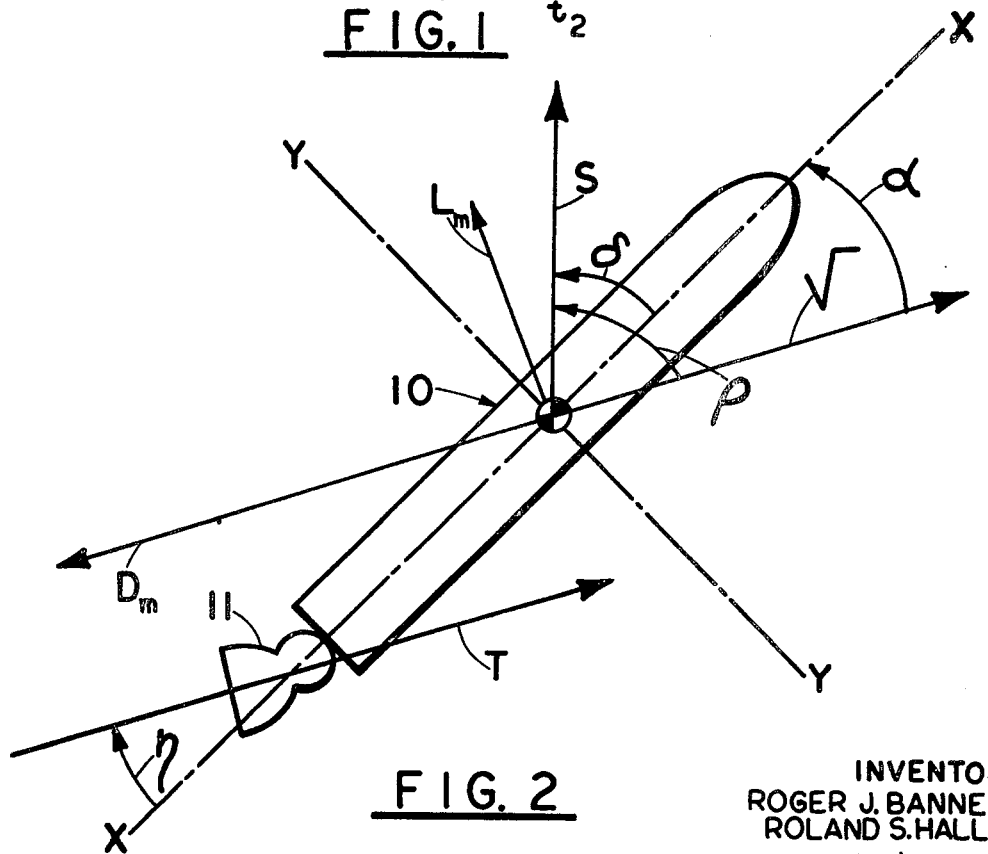
FIG. 2 is a vector diagram of the missile at time $t_2$ of FIG. 1 oriented according to the present invention.

As illustrated in more detail in FIG. 2 missile 10 is shown generally aligned with respect to its flight path C and the corresponding location of target P to conform with the alignment thereof at time $t_2$ of FIG. 1. A missile-fixed coordinate system X, Y and Z originates at the center of gravity (C.G.) of the missile 10, wherein the X coordinate aligns with the longitudinal axis of the missile and the Y and Z coordinates are normal thereto. The three-dimensional space defined by the X-Y-Z coordinate system fixed to the missile also defines the orientation of a plurality of vectors of either force or orientation acting on the missile. In this illustration all of the vectors are shown to align within the X-Y plane for purposes of clarity; however it is to be understood that the illustration is expandable to cases where the various vectors have components thereof in the X-Z plane as well. Accordingly, the vectors shown describe a special case in the general description of the missile 10 and are not intended to limit the scope of the invention.

A vector S, corresponding to the line-of-sight in FIG. 1 between the C.G. of the missile 10 at time $t_2$ along its flight path C and the time $t_2$ on the flight path D of the target P, is shown describing a total angle $\delta$ with respect to the X coordinate of the missile. A vector V, also originating at the C.G., corresponds to the instantaneous direction of flight path C at time $t_2$ of FIG. 1, describing a total angle of attack $\alpha$ with respect to the X coordinate. At the aft end of missile 10 there is shown a gimbaled nozzle 11, the central axis thereof forming a thrust vector T at an angle $\eta$ to the coordinate of the missile. The total angles $\delta$, $\eta$ and $\alpha$, described by corresponding vectors S, T and V with respect to the X coordinate of the missile 10, also coincide with the projections thereof on the X-Y plane in this illustration. For purposes of further description subscripts $y$ and $z$ will be utilized in reference to the projections of the vectors and their respective angles on the corresponding X-Y and X-Z planes.

Generally the motion of the missile 10, once launched, is determined by aerodynamic vectors of lift $L_m$ and drag $D_m$ and aerodynamic moments together with the forces and moments generated by the thrust vector T. As illustrated in FIG. 2 the attitude of missile 10 and the orientation of the nozzle 11 are such that a large angle of attack $\alpha$ is formed, consequently a relatively large drag vector $D_m$ is generated opposite vector V, decelerating the missile along vector V. The lift vector $L_m$ and the component of the thrust vector T along the lift vector provide the acceleration component normal to vector V resulting in a change in the flight path.

Figure 3:
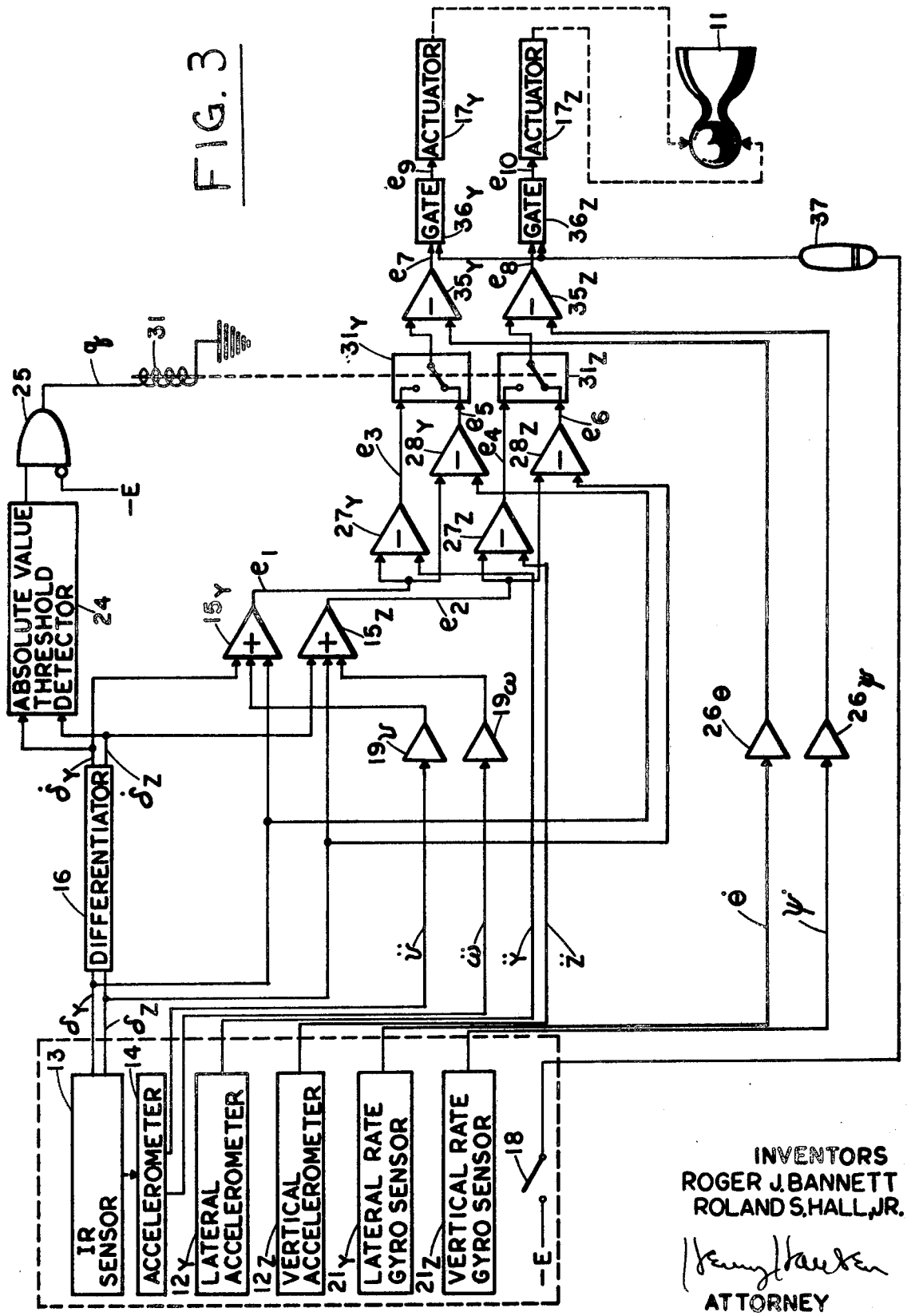
FIG. 3 is a block diagram of the inventive missile guidance and control system.

Referring now to FIG. 3, the missile 10 contains a servo-actuated infrared sensor 13 locked on by any means well known in the art to the target P, the central or field of view axis thereof being coincident with the vector S of FIG. 2. Attached to the servo-actuated sensor 13 and movable therewith is an accelerometer 14 having two orthogonal sensing axes normal to the central axis of sensor 13, wherein the sensing axes are initially aligned along the Y and Z coordinates of the missile 10 when the sensor 13 central axis is coincident with the X coordinate of the missile. Also mounted to the missile 10 are two accelerometers 12$y$ and 12$z$ affixed to the missile such that their sensing axes align respectively with the Y coordinate of the X-Y plane and the Z coordinate in the X-Z plane. Thus, accelerometer 12$y$ registers body accelerations normal to the X axis along the Y coordinate and the 12$z$ accelerometer registers the corresponding accelerations along the Z coordinate. Body angular rate measurement is provided in missile 10 by two affixed orthogonal rate gyro sensors 21$y$ and 21$z$, respectively registering the angular rates of the body in the X-Y and X-Z planes. Also included in missile 10 is a launch switch 22 which interrupts a voltage signal $-E$ while the missile is attached to the aircraft A and which closes and passes the $-E$ voltage once the missile separates from the aircraft.

Accelerometer 14 provides voltage signals $\ddot{v}$ and $\ddot{w}$ indicating the accelerations registered thereon corresponding to the sensing axes respectively referenced to the Y and Z coordinates. Lateral accelerometer 12$y$ and vertical accelerometer 12$z$, in turn, register body accelerations normal to the X coordinate along coordinates Y and Z, respectively, providing voltage signals $\ddot{y}$ and $\ddot{z}$ indicative of the corresponding registered accelerations. The angular rates of missile 10 in the X-Y and X-Z planes respectively are registered by the rate gyro sensors 21$y$ and 21$z$ which provide corresponding voltage signals $\dot{\theta}$ and $\dot{\psi}$ indicative of the respective angular rates.

The respective signals indicating the particular parameters of missile 10 motion and the orientation thereof relative to the target P are combined to form control loops as described hereinbelow.

Specifically sensor signal $\delta y$ is commonly fed to a differentiator 16 and a summing amplifier 15y; signal $\delta z$ is also fed to the differentiator 16 and commonly to a summing amplifier 15z. Differentiator 16, at its output, provides voltage signals $\dot{\delta}y$ and $\dot{\delta}z$ indicative of the rates of the corresponding input signals $\delta y$ and $\delta z$ respectively. Signals $\dot{\delta}y$ and $\dot{\delta}z$ are then fed to an absolute value threshold detector 24 and are rectified into absolute signals by any well known means. The rectified signals are then combined according to a predetermined relationship and compared against a preselected threshold by any means well known in the art. The selection of a threshold can be based on various combinations of missile 10 parameters, one of which, for example, may be the structural limit of the missile in the Y and Z directions. In this example sensor 13 angular rate signals $\dot{\delta}y$ and $\dot{\delta}z$ represent commands to the rocket nozzle 11, as described hereinbelow, resulting in predictable commanded flight path changes or normal accelerations of the missile along the Y and Z coordinates. Large changes in flight path cannot be accommodated at large velocities along vector V without exceeding the structual limits, accordingly missile 10 must first dissipate the large velocity vector V along the flight path by turning to a higher angle of attack $\alpha$. Thus by setting the threshold at approximately one-half of the respective structural limits corresponding to the rate signals $\dot{\delta}y$ and $\dot{\delta}z$ vector V is continuously dissipated. The various combinations of signals $\dot{\delta}y$ and $\dot{\delta}z$ in the X-Y and the X-Z planes are respectively compared against a threshold corresponding to the structural limit in that plane. Since the missile is generally symmetrical about the X-Y and X-Z planes the signals $\dot{\delta}y$ and $\dot{\delta}z$ are receitifed requiring only a single-valued threshold. Threshold detector 24, at the output side thereof, generates a binary signal $\hat{\delta}$ corresponding to either an exceedance of the combination of the signals $\dot{\delta}y$ and $\dot{\delta}z$ over the preselected threshold or non-exceedance with respect thereto. Binary signal $\hat{\delta}$ together with a fixed signal $-E$ are fed to a NAND gate 25 the output thereof forming a binary signal $q$ having a 0 level indicative of the NAND condition, i.e., where signals $\hat{\delta}$ and $-E$ are opposite signal $q$ is nonzero, and where signals $\hat{\delta}$ and $-E$ are same signal $q$ is zero.

Accelerometer 14 output signals $v$ and $w$, respectively, are driven through amplifiers 19v and 19w, respectively, the gain values thereof relative the other signal gains being preselected according to well-known criteria of stability and accuracy. The output of amplifiers 19v and 19w is fed to the input side of summing amplifiers 15y and 15z, respectively. The output signal $E_1$ of amplifier 15x is fed in common to differential amplifiers 27y and 28y; similarly the output signal $e_2$ of amplifier 15z is fed in common to differential amplifiers 27z and 28z. Differential amplifiers 27y and 27z also receive signals $\ddot{y}$ and $\ddot{z}$, respectively, from the corresponding lateral accelerometer 12y and vertical accelerometer 12z. Amplifiers 27y and 27z serve as the summing modes of the exterior or homing loops and the interior or augmentation loops. Accordingly, the output signals $e_3$ and $e_4$ of amplifiers 27y and 27z respectively represent the first mode or the homing mode of the present invention. Similarly, signals $e_1$ and $e_2$ are fed into differential amplifiers 28y and 28z, respectively, which also receive at the input side thereof signals $\delta y$ and $\delta z$ corresponding to the angular displacement of the sensors 13 central axis (or vector S of FIG. 2) resolved onto the X-Y and the X-Z planes. The output signals $e_5$ and $e_6$ of amplifiers 28y and 28z respectively form the forward signal of the missile control loop in its second or turning mode. Thus, by selectively switching between signals $e_3$ and $e_5$ and at the same time between signals $e_4$ and $e_6$, two different control modes are possible, the first generally forming a homing mode wherein the lateral and vertical body acceleration signals $\ddot{y}$ and $\ddot{z}$ are conplementing the accelerometer 14 signals $\dot{v}$ and $\dot{w}$. In the second mode the loop closure is across accelerometer 14 fixed to sensor 13 such that upon large angles $\delta y$ and $\delta z$ the tendency of the loop will be to settle out or reduce acceleration components emitted as signals $\dot{v}$ and $\dot{w}$ normal to the line of sight vector S of FIG. 1. At the same time by summing signals $\delta y$ and $\delta z$ the missile will be turned toward the target P. Thus in the second mode accelerations normal to the line of sight vector S are reduced and the missile 10 is vectored to the target P with minimal flight path excursions normal to the line of sight. The overall tendency of this form of control is to reduce the turning radius at conserve turning energy thereby allowing sufficient propellant for the homing or chase mode segment of the flight.

Switches 31y and 31z perform the required switching between the modes by alternatively closing the loops on signals $e_3$ and $e_5$ or $e_4$ and $e_6$, corresponding to the first and second modes of contemplated missile control. Switches 31y and 31z are commonly ganged to one relay winding 31 which receives the signal $q$ from the NAND gate 25 and NAND gate 25 selects the mode or emits signal $q$ according to the signal $\hat{\delta}$ from threshold detector 24 as described above.

The outputs of switches 31y and 31z which alternatively carry signals $e_3$ and $e_5$, or signals $e_4$ and $e_6$, are fed to differential amplifiers 35y and 35z which also receive the body rate signals $\dot{\theta}$ and $\dot{\psi}$ amplified by amplifiers 26$\theta$ and 26$\psi$, representing the corresponding body angular rates in the X-Y plane and the X-Z plane. These are typical rate augmentation loops commonly practiced in the prior art to stabilize missiles which may possess undesirable aerodynamic angular rate damping coefficients.

Differential amplifiers 35y and 35z generate signals $e_7$ and $e_8$, respectively, received by corresponding gates 36y and 36z. Gattes 36y and 36z, also at the input end thereof, receive a guidance enabling signal $e_{12}$ from a delay circuit 37. Delay circuit 37 is activated by switch 18 in the missile, which upon launch, is closed initiating the delay and disabling missile to clear the aircraft A of FIG. 1 corresponding to the time interval $t_0$ to $t_1$. Throughout the delay time sensor 13, accelerometers 14, 12y and 12z and rate gyro sensors 21y and 21z are active, all loop signals to gates 36y and 36z are generated and the loops are disabled only at the terminal outputs of amplifiers 35y and 35z until time $t_1$ after launch of the missile.

The operation of the inventive homing guidance system will now be described with reference to FIGS. 1, 2 and 3. In FIG. 1, the target aircraft P is shown traveling on a flight path D substantially opposite to the flight path of the launching aircraft A. The servo-actuated sensor 13 is locked on to the target P prior to launch or prior to time $t_0$. At time $t_0$ missile 10 is separated from the aircraft A and is propelled by its own power with the nozzle 11 fixed for the period between time $t_0$ and time $t_1$ which is preselected such that the missile clears the aircraft A before any homing maneuvers are initiated. This delay is accomplished by nulling the control inputs to actuators 17y and 17z by the delay 37. Once the predetermined delay time has elapsed gates 36y and 36z connect the signals $e_7$ and $e_8$ from amplifiers 35y and 35z respectively to the inputs to actuator 17y and 17z. As shown in FIG. 2, the infrared sensor 13 describes relatively large angles $\delta y$ and $\delta z$ with respect to the body longitudinal coordinate X. At these large angles, and in particular in view of the direction of the flight path D of target P, the differentiated rate signals $\dot\delta y$ and $\dot\delta z$ are also relatively large, indicating that a large angle reorientation of the missile flight path C is required. Consequently, when the combination of $\delta y$ and $\delta a$ exceeds a preselected level gate 25, through a relay 31, actuates two parallel switches 31y and 31z which throw the control loops into a second or turning mode, wherein loop closure is formed around accelerometer 14 normal to the vector S coincident with the sensor 13 central axis and the body-fixed accelerometers 12y and 12z are nulled. The missile 10 in response to signals $\delta y$, $\delta z$, $\dot\delta y$, $\dot\delta z$, $\ddot v$ and $\ddot w$ then goes through an abrupt attitude change exposing a large angle of attack $\alpha$ to vector V which results in lift $L_m$ and drag $D_m$ components decelerating the missile and at the same time turning the coordinate X toward the target P.

The relative signal strengths of signals $\delta$, $\dot\delta$, $\ddot y$ and $\ddot z$, $\dot\theta$ and $\dot\psi$, and $\dot v$ and $\dot w$, their amplification through amplifiers 15, 19, 26, 27 and 35, and the actuator 17 gains are preselected according to well-known techniques of stabilization of the missile 10 along its flight path and homing control. For example, by matching the overall gain of signals $\dot\delta y$ and $\dot\delta z$, generated in differentiator 16 and amplified across amplifiers 15 and 27, with the outputs $\dot\theta$, $\dot\psi$ amplified by amplifiers 26, an intercept trajectory is determined for the homing mode if the signal strength out of differentiator 16 is relatively high as compared with the signals $\delta y$ and $\delta z$. This trajectory characteristically limits the motion of the line of sight vector S in inertial space thereby constraining missile 10 to fly a collision course. At the same time by a selection of gains of amplifiers 15, which are relatively low as compared with the gains of amplifiers 28 and 19, the turning mode possessing relatively high clamping characteristics around signals $\delta$ and $\theta$ and $\psi$ is satisfied. Further gain relationships are similarly determined according to well-known stabilization techniques including the aerodynamic and inertia parameters of missile 10.

Once the missile longitudinal axis and the velocity vector thereof are generally aligned towards the target detector 24 sends a 0 signal which, through gate 25, disables relay 31, and at the same time throws switches 31y and 31z towards the second position which now connects the body lateral and vertical accelerometers 12y and 12z complementing accelerometer 14, wherein the lateral accelerometers 12y and 12z tend to reduce the normal accelerations with respect to the X axis.

Some of the many advantages of the present invention should now be readily apparent. The inventive arrangement of accelerometr loops fixed to a locked-on servo-actuated sensor allows large angle of attack attitudes of the body thereby providing the necessary aerodynamic moments and deceleration forces required to quickly change the velocity vector V of the missile as launched. Thus, a quick change in velocity vector V of the missile is accomplished with minimal consumption of propellant conserving such propellant for the homing and chase sections of the flight. This the invention accomplishes with minimal added components and at the same time with components which are generally well known and whose reliability is well known. The guidance options thus formed allow for flexibility of the flight characteristics of the launching aircraft without encumbering that aircraft with excessive penalties of missile weight and size.

Obviously many modifications and variations of the present invention are possible in the light of the above teachings. It is therefore to be understood that within the scope of the appended claims the invention may be practiced otherwise than as specifically described.

What is claimed is:

1. A guidance system for an air-to-air homing thrust vector controlled missile, comprising in combination:

sensor means formed to be mounted on the missile for providing two signals indicative of orthogonal component angles between a target line-of-sight and the longitudinal axis of the missile;

first accelerometer means formed to be operatively mounted on the missile for providing two signals indicative of orthogonal accelerations in a plane normal to the target line-of-sight;

second accelerometer means formed to be mounted on the missile for providing two signals indicative of orthogonal accelerations in a plane normal to the longitudinal axis of the missile;

differentiator means connected to receive said sensor means signals for providing signals indicative of the respective rates thereof;

first and second summing means respectively connected to receive corresponding ones of the signals from said first accelerometer means, said sensor means and said differentiator means for providing output signals indicative of the sums thereof;

first and second subtracter means respectively connected to receive corresponding ones of the signals from said first and second summing means and said second accelerometer means for providing difference signals;

threshold means connected to receive said differentiator means signals for combining them according to a predetermined relationship indicative of the structural loading and for producing an output signal when a preselected limit thereof is exceeded; and first and second switch means respectively connected to receive corresponding ones of the signals from said first and second subtracter means, and said threshold means for selectively transmitting said subtracter signals in absence of a threshold means signal, and for selectively transmitting said summing means signals in presence of a threshold means signal for controlling the thrust vector of the missile.

2. A guidance system according to claim 1 further comprising: said first and second accelerometer means being parallel sensing axes when the target line-of-sight and the missile axis are parallel.

3. A guidance system according to claim 2 further comprising:
rate sensing means formed to be mounted on the missile for providing signals indicative of the lateral and vertical angular rates of the missile; and
third and fourth subtracter means respectively connected to receive said first and second switch means transmitted signals and said rate sensing means signals for providing difference signals.

4. A guidance system according to claim 3 further comprising:
third switch means formed to be mounted on the missile responsive to launch separation from an aircraft;
time delay means connected to said third switch means and initiated thereby; and
gate means connected to receive the signals from said third and fourth subtracter means and said time delay means for transmitting said third and fourth subtracter means signals at a predetermined time after the missile is launched.

5. A guidance system for an air-to-air homing thrust vector controlled missile comprising, in combination:
sensor means formed to be mounted on the missile for providing a signal indicative of the angle between a target line-of-sight and the longitudinal axis of the missile;
first accelerometer means formed to be operatively mounted on the missile for providing a signal indicative of the acceleration normal to the target line-of-sight;
second accelerometer means formed to be mounted on the missile for providing a signal indicative of acceleration normal to the longitudinal axis of the missile;
differentiator means connected to receive said sensor means signal for providing a signal indicative of the rate thereof;
summing means connected to receive the signals from said first accelerometer means, said sensor means and said differentiator means for providing output signals indicative of the sum thereof;
first subtracter means connected to receive the signals from said summing means and said second accelerometer means for providing a difference signal;
threshold means connected to receive said differentiator means signal for determining the structural loading according to a predetermined relationship indicative of the structural loading and for producing an output signal when a preselected limit thereof is exceeded; and
first switch means connected to receive the signals from said subtracter means, and said threshold means for selectively transmitting said subtracter means signal in absence of a threshold means signal, and for selectively transmitting said summing means signal in presence of a threshold means signal.

6. A guidance system according to claim 1 further comprising:
said first and second accelerometer means having parallel sensing axes when the target line-of-sight and the missile axis are parallel.

7. A guidance system according to claim 2 further comprising:
rate sensing means formed to be mounted on the missile for providing a signal indicative of the angular rate of the missile; and
second subtracter means connected to receive said switch means transmitted signal and said rate sensing means signal for providing a signal indicative of the difference thereof.

8. A guidance system according to claim 7 further comprising:
second switch means formed to be mounted on the missile responsive to the launch separation from an aircraft;
time delay means connected to said second switch means and initiated thereby; and
gate means connected to receive the signals from said second subtracter means and said time delay means for transmitting said second subtracter means signal at a predetermined time after the missile is launched.

* * * * *

UNITED STATES PATENT OFFICE
CERTIFICATE OF CORRECTION

Patent No. 3,735,944  Dated  May 29, 1973

Inventor(s) Roger J. Bannett and Roland S. Hall, Jr.

It is certified that error appears in the above-identified patent and that said Letters Patent are hereby corrected as shown below:

On the front page, data element identifier:

[75] Inventors: Roger J. Bannett, Willow Grove;
Roland S. Hal, Jr., Ivyland, both of Pa.

should read:

[75] Inventors: Roger J. Bannett, Willow Grove;
Roland S. Hall, Jr., Ivyland, both of Pa.

Signed and sealed this 18th day of December 1973.

(SEAL)
Attest:

EDWARD M. FLETCHER, JR.
Attesting Officer

RENE D. TEGTMEYER
Acting Commissioner of Patents